March 3, 1964   R. E. ROSS   3,123,344
GLASS BENDING FURNACES
Filed March 30, 1960
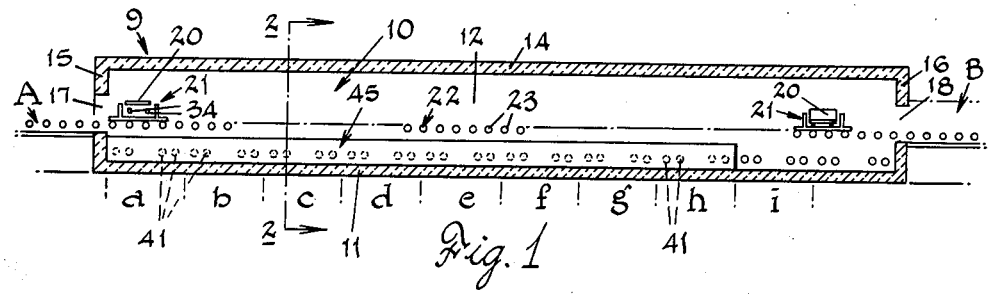
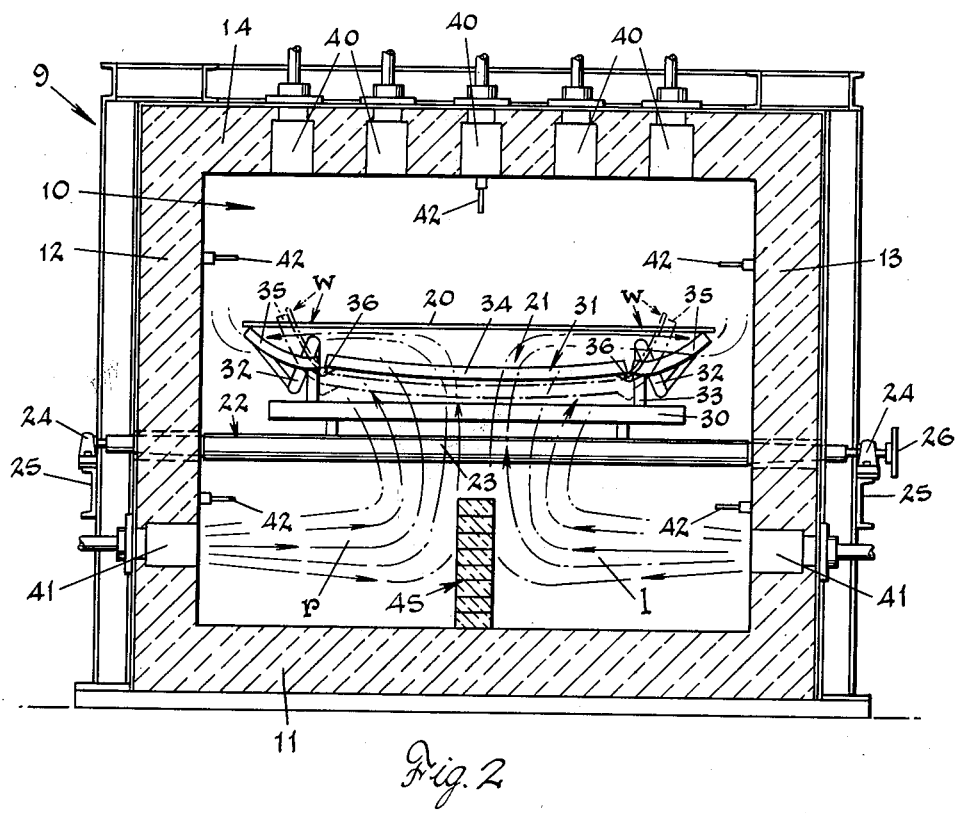
INVENTOR.
Robert E. Ross
BY
Hobbe & Swope
ATTORNEYS

United States Patent Office

3,123,344
Patented Mar. 3, 1964

3,123,344
GLASS BENDING FURNACES
Robert E. Ross, Toledo, Ohio, assignor to Libbey-Owens-Ford Glass Company, Toledo, Ohio, a corporation of Ohio
Filed Mar. 30, 1960, Ser. No. 18,633
2 Claims. (Cl. 263—6)

The present invention relates broadly to the bending of sheets or plates of glass and more particularly to an improved glass bending furnace.

In the bending of glass sheets or plates, such as those used in the fabrication of automobile windshields, it is customary to support the flat sheets or plates to be bent horizontally upon peripheral or skeleton type bending molds and to then pass the molds and sheets through a bending furnace, with the longitudinal axes of the sheets extending transversely of the furnace and normal to the direction of travel of the molds. During the passage of the molds through the bending furnace, the glass sheets are heated to a temperature at which they become softened and sag into conformity with the shaping surface of the mold. The heating of the sheets is ordinarily accomplished by the provision of gas burners and/or electric heaters positioned above the path of travel of the molds and also by heating means located beneath the path of travel of the molds. The latter heating means may consist of radiant gas burners positioned in the side walls of the furnace and arranged to direct radiating heat currents transversely of the path of travel of the molds.

As is well known, present day automobile windshields of the so-called panoramic or wrap-around type consist of a central portion of relatively shallow curvature and more severely curved end portions which form wing portions extending rearwardly of the vehicle along the opposite sides thereof. It has been found, in furnaces of the above type, that it is difficult to obtain equalized or uniform heating of the wing portions and this is believed to be caused by the action of the radiant gas burners located in the side walls of the furnace beneath the glass sheets. Thus, it has been found that the radiant heat currents from such heat sources, although at controlled temperatures, tend to shift transversely of the furnace due to changes in pressure or undesirable turbulence resulting in un-uniform heating of the glass sheets, particularly the wing portions thereof.

The principal object of this invention therefore resides in the provision of an improved glass bending furnace having means for controlling the heat currents from the heat sources in the side walls of the furnace to obtain more uniform heating of the glass sheets.

Another object of the invention is to provide, in a bending furnace of the above character, means for controlling the movement of the heat currents to obtain a more balanced condition transversely of the furnace.

Another object of the invention is to provide, in a glass bending furnace of the above character, means for substantially preventing the heat currents emanating from the heat sources at one side of the furnace from intermingling or conflicting with the heat currents emanating from the heat sources at the opposite side of the furnace, whereby the movement of heat currents along opposite sides of the furnace is stabilized in a manner to obtain a more equalized and uniform heating of the wing portions of the glass sheets.

Other objects and advantages of the invention will become more apparent during the course of the following description, when read in connection with the accompanying drawings.

In the drawings, wherein like numerals are employed to designate like parts throughout the same:

FIG. 1 is a longitudinal vertical sectional view of a glass bending furnace constructed in accordance with the invention; and FIG. 2 is a vertical transverse sectional view of the furnace taken on line 2—2 of FIG. 1.

Referring now to the drawings, the glass bending furnace constructed in accordance with this invention is designated in its entirety by the numeral 9. The furnace 9 comprises an elongated tunnel-like heating chamber 10 which is provided with a bottom wall 11, side walls 12 and 13, top wall 14 and front and rear walls 15 and 16 respectively; all being formed of suitable heat insulating material. Adjacent the entrance end 17 of the furnace chamber 10 is a glass loading station A while communicating with the exit end 18 of the heating chamber is an annealing lehr or section B through which the glass sheets are conveyed after being bent.

The glass sheets 20 to be bent are supported upon bending apparatus 21 and the furnace is equipped with a substantially horizontally disposed roll conveyor 22 to support and carry the bending apparatus and glass sheets through the heating chamber. As shown in FIG. 2, the opposite ends of each conveyor roll 23 are journaled in bearings 24 mounted exteriorly of the side walls 12 and 13 on the furnace framing structure 25. Preferably, one end of each roll is equipped with a sprocket 26 which, by means of a sprocket chain or like drive, is driven in unison with the rest of the rolls.

By way of example, the bending apparatus 21 comprises a rack 30 which carries an articulated, peripheral type bending mold 31 by means of links 32 pivotally supported on the rack by vertical posts 33. As disclosed, the mold 31 includes a center section 34 and end sections 35 movably connected to the opposite ends of the center section 34, such as by hinges 36. For a more detailed disclosure of bending molds of this general character, attention is directed to Patent No. 2,893,170, dated July 7, 1959.

When the bending mold 31 is in open position, as shown in full lines in FIG. 2, the end sections 35 are swung outwardly and downwardly about the axes of hinges 36 and the flat glass sheets 20 are supported at their opposite ends upon the end mold sections. As the glass sheets are carried forwardly through the chamber 10, they become heated to a softened condition so as to bend downwardly by gravity onto the bending mold. As the glass sheets become softened and sag into the mold, the end sections 35 are gradually swung upwardly and inwardly and the sheets settle thereon until the end sections reach the mold closed position, whereupon the sheets are bent into conformity therewith. As will also be seen in FIG. 2, the glass sheets 20 are carried by the bending molds 31 through the furnace chamber 10 with their longitudinal axes disposed transversely to the longitudinal axis of the furnace and substantially normal to the direction of travel therethrough.

In establishing a preferential heat pattern within the furnace to gradually raise the temperature of the glass sheets to a softened condition, heat sources, such as radiant gas burners 40, are arranged in the top wall 14 while similar radiant gas burners 41 are located along and in the side walls 12 and 13 between the bottom wall 11 and the roll conveyor 22. By means of the indicated readings from thermocouples 42, positioned above and beneath the path of travel of the glass sheets, the burners in the several zones of the furnace are adjusted to maintain a rising heat gradient throughout such zones and particularly those indicated by the letters $a$, $b$, $c$, $d$, $e$, $f$, $g$ and $h$ in FIG. 1. As shown in this figure, the burners 41 are arranged in longitudinally spaced relation to one another in each of the zones in the side wall 12 and are substantially aligned with similar burners 41 located in side wall 13.

As the glass sheets are successively carried through zones *a* through *h* of the furnace, they will be gradually brought to the desired temperature to soften the glass and cause it to bend downwardly into conformity with the mold as the mold closes as described above. When the glass sheets reach zone *i*, they will have been softened and bent into conformity with the bending mold which has moved to its closed position as shown in broken lines in FIG. 2. During the passage of the molds through the furnace, it is of course desirable that the glass sheets be uniformly heated. However, this has heretofore presented a problem in bending furnaces of the customary type. One objection is the entry of undesirable air currents into the front end of the furnace resulting in objectional turbulence which has an adverse effect upon the heat currents emanating from the side burners 41. Also, while the general heated condition in the furnace may appear to be normal as indicated by the thermocouples 42, any fluctuation in the pressure of the fuel supply at one side of the furnace or the other will create heat currents of greater velocity with a transverse shifting of the more highly heated area and a resultant heating of one end portion of the glass sheets to a greater degree than the opposite end portion. Likewise, when the fuel supply pressures exceed, even temporarily, the optimum to be maintained, the resulting heat currents merge at the center of the furnace in a rising pattern against the central area of the sheets which, because of their relatively shallow curvature, are more satisfactorily bent at a lower temperature.

To minimize, if not eliminate, these objections, the present invention contemplates the provision of means within the furnace for substantially preventing the radiant heat currents emanating from the burners 41 at one side of the furnace from intermingling or conflicting with the heat currents emanating from the burners at the opposite side of the furnace regardless of any variation in pressure at the respective burners. Such means comprises a vertical barrier or partition wall 45 carried by the bottom wall of the furnace and extending longitudinally of the heating chamber 10 substantially midway between the opposite side walls 12 and 13 of the furnace. The partition wall 45 may be formed of several courses of refractory brick and preferably extends from the front wall 15 through and including heating zone *h*. The top of the partition wall terminates adjacent to but in spaced relation to the conveyor rolls 23 and is of sufficient height to obstruct the heat currents issuing from the burners 41. The provision of the partition wall 45 operates to create a heating pattern in the heating chamber 10, generally indicated by the arrows *r* and *l* of FIG. 2. Thus, the heat currents *r* issuing from burners 41 in side wall 12 impinge against the partition wall and are directed upwardly and then outwardly to create a heating pattern which will direct the heat currents upon the end portions of the glass sheets where the more severely bent areas are located. The arrows *l* similarly indicate the path of radiant heat currents issuing from the burners 41 in side wall 13.

It will be appreciated that in the absence of the partition wall 45, the force of the heat currents from one side of the furnace may cause them to be combined or intermingled with those from the other side of the furnace and upon variations in pressure at one or the other side of the furnace the point at which the heat currents are combined will be shifted transversely of the furnace so that one end portion of the glass sheet will be heated to a greater degree than the other end portion. However, by the provision of the partition wall 45, the movement of the heat currents along opposite sides of the furnace are stabilized and controlled in such a manner that a more equalized and uniform heating of the glass sheets is achieved. In other words, the movement of the heat currents is controlled in a manner to obtain a more balanced condition transversely of the furnace.

A further advantage in the provision of the partition wall 45 is in the heating of the central portions of the glass sheets and the maintenance of a more stabilized heat pattern. This results from the more even distribution of heat against the bottom surfaces of the sheets as the radiant heat currents, indicated by arrows *r* and *l*, rise upwardly along opposite sides of the partition wall and curve outwardly along the wing portions *w* of the glass sheets. In fact, due to this more regulated heating of the central areas of the sheets, the radiant heat from burners 40 in the top wall 14 located along the medial line of the furnace chamber can be somewhat reduced. Further, by the provision of the longitudinally extending partition wall, the heating conditions or heat pattern in the several zones of the furnace chamber, as recorded by the thermocouples 42, can be more uniformly maintained.

It is to be understood that the form of the invention herewith shown and described is to be taken as a preferred embodiment of the same, and that various changes in the shape, size and arrangement of parts may be resorted to without departing from the spirit of the invention.

I claim:

1. In a furnace for bending glass sheets, a horizontally elongated heating chamber comprising a bottom wall, side walls, and a top wall, conveyor means in said chamber for conveying a bending apparatus and glass sheets supported thereon along a substantially horizontal path therethrough, first heat sources arranged in the top wall of said chamber, second heat sources arranged at the opposite sides of the heating chamber beneath said conveyor for directing heat currents transversely of the path of travel of the bending apparatus and glass sheets, and a refractory partition wall positioned longitudinally of the heating chamber between said second heat sources and extending upwardly from said bottom wall to a point adjacent to but spaced beneath said conveyor means for substantially preventing the heat currents from the heat sources at one side of the heating chamber from intermingling with the heat currents from the heat sources at the opposite side of the heating chamber.

2. In a furnace for bending glass sheets as claimed in claim 1, in which said second heat sources comprise radiant gas burners.

References Cited in the file of this patent

UNITED STATES PATENTS

| | | |
|---|---|---|
| 1,140,105 | Bickmeir et al. | May 18, 1915 |
| 1,998,627 | Kormann | Apr. 23, 1935 |
| 2,175,834 | Fatkin | Oct. 10, 1939 |
| 2,215,079 | Hess | Sept. 17, 1940 |
| 2,646,647 | Bamford et al. | July 28, 1953 |
| 2,671,988 | Walters | Mar. 16, 1954 |
| 2,784,531 | Hahn | Mar. 12, 1957 |

FOREIGN PATENTS

| | | |
|---|---|---|
| 564,041 | Belgium | Feb. 15, 1958 |